US012731571B2

(12) United States Patent
Lim

(10) Patent No.: US 12,731,571 B2
(45) Date of Patent: Sep. 8, 2026

(54) ACTIVE NOISE CANCELLING DEVICE AND SYSTEM FOR MOBILE VEHICLES

(71) Applicant: HYUNDAI MOBIS CO., LTD., Seoul (KR)

(72) Inventor: Hyung Sub Lim, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 198 days.

(21) Appl. No.: 18/641,896

(22) Filed: Apr. 22, 2024

(65) Prior Publication Data

US 2025/0061877 A1 Feb. 20, 2025

(30) Foreign Application Priority Data

Aug. 18, 2023 (KR) ........................ 10-2023-0108460

(51) Int. Cl.
*G10K 11/178* (2006.01)

(52) U.S. Cl.
CPC .. *G10K 11/17815* (2018.01); *G10K 2210/128* (2013.01); *G10K 2210/3012* (2013.01)

(58) Field of Classification Search
CPC ....... G10K 11/17815; G10K 2210/128; G10K 2210/3012
USPC ........................................................ 381/71.4
See application file for complete search history.

(56) References Cited

U.S. PATENT DOCUMENTS

2010/0014685 A1* 1/2010 Wurm .............. G10K 11/17823 381/71.11
2015/0364125 A1* 12/2015 Park ....................... G10K 15/02 701/36
2020/0327876 A1* 10/2020 Kwon ...................... G01H 1/12

* cited by examiner

*Primary Examiner* — Paul Kim
*Assistant Examiner* — Douglas J Suthers
(74) *Attorney, Agent, or Firm* — Morgan, Lewis & Bockius LLP

(57) ABSTRACT

The present disclosure relates to an active noise cancelling device and system for a mobile vehicle, and in particular, to an active noise cancelling device and system for a mobile vehicle capable of controlling noise according to driving information of a mobile vehicle. The present disclosure is directed to varying a period for generating cancellation target noise information according to driving information of a mobile vehicle.

8 Claims, 3 Drawing Sheets

ACTIVE NOISE CANCELLING DEVICE AND SYSTEM FOR MOBILE VEHICLES

CROSS-REFERENCE TO RELATED APPLICATIONS

This application claims priority under 35 U.S.C. § 119 to Korean Patent Application No. 10-2023-0108460, filed on Aug. 18, 2023, in the Korean Intellectual Property Office, the disclosure of which is incorporated herein by reference in its entirety.

TECHNICAL FIELD

The following disclosure relates to an active noise cancelling device and system for a mobile vehicle, and in particular, to an active noise cancelling device and system for a mobile vehicle capable of controlling noise according to driving information of a mobile vehicle.

BACKGROUND

In general, noise cancelling refers to a technology that cancels out or blocks external noise. Noise cancelling is classified into two methods: active noise cancelling (ANC) and passive noise cancelling (PNC). Active noise cancelling refers to a technology that uses a destructive interference phenomenon of sound. In other words, active noise cancelling is a technology that cancels noise by identifying a phase and amplitude of noise to be canceled, calculating a completely opposite phase and amplitude, and artificially generating a waveform.

Such active noise cancelling is often used in audio equipment, such as earphones and headphones, and recently, active noise cancelling technology has been applied to mobile vehicles, such as vehicles and aircraft and used to block noise generated in mobile vehicles.

Active noise cancelling generally uses the filtered-x least mean square (FxLMS) algorithm. The active noise cancelling system includes a microphone that measures noise, a controller that generates a signal for noise control, a speaker that generates a signal for noise control, and a microphone that measures a noise control result. At this time, the controller may generate a signal for noise control using the FxLMS algorithm. The stability and generation cycle of the signal for noise control generated by the controller are determined by a step size (convergence coefficient, p) of the FxLMS algorithm. In general, in active noise cancelling systems applied to mobile vehicles, the step size of the FxLMS algorithm is fixed to an optimal value through testing. However, if the step size of the FxLMS algorithm is fixed, all noise that changes depending on various driving environments cannot be controlled.

SUMMARY

An exemplary embodiment of the present disclosure is directed to varying a period for generating cancellation target noise information according to driving information of a mobile vehicle.

In one general aspect, an active noise cancelling device for a mobile vehicle includes: a noise extractor generating cancellation target noise information from an input sound signal; and a controller providing a noise control signal to an audio transmission device based on the cancellation target noise information, in which the noise extractor varies a period for generating the cancellation target noise information based on driving information of the mobile vehicle.

The noise extractor may generate the cancellation target noise information using a filtered-x least mean square (FxLMS) algorithm and vary the period for generating the cancellation target noise information by varying a convergence coefficient of the FxLMS algorithm according to the driving information of the mobile vehicle.

The noise extractor may vary the period for generating the cancellation target noise information based on the driving information of the mobile vehicle, and the driving information of the mobile vehicle may include at least one of acceleration information, torque output information, revolutions per minute (RPM) output information, or pedal and brake input/output information of the mobile vehicle.

The noise extractor may vary the period for generating the cancellation target noise information according to a level of acceleration of the mobile vehicle based on the acceleration information.

The noise extractor may vary the period for generating the cancellation target noise information according to a level of torque output of the mobile vehicle based on the torque output information.

The noise extractor may vary the period for generating the cancellation target noise information according to a level of RPM output of the mobile vehicle based on the RPM output information.

The noise extractor may vary the period for generating the cancellation target noise information based on the pedal and brake input/output information.

When the driving information of the mobile vehicle is received, the noise extractor may predict a level of noise generation according to a driving situation by comparing the received driving information with pre-stored data.

In another general aspect, an active noise cancelling system for a mobile vehicle includes: a first audio input device through which a sound signal is input; an active noise cancelling device having the characteristics described above; an audio transmission device outputting the noise control signal; and a second audio input device to which a correction signal obtained by combining the sound signal and the noise control signal is input, wherein the active noise cancelling device varies at least one characteristic of a convergence speed or stability of a noise estimation function based on driving information of the mobile vehicle, receives the correction signal, and generate the noise control signal based on the correction signal.

The active noise cancelling device may generate the noise control signal using a filtered-x least mean square (FxLMS) algorithm and vary at least one characteristic of the convergence speed or the stability of the noise estimation function by varying a convergence coefficient of the FxLMS algorithm according to driving information of the mobile vehicle.

Other features and aspects will be apparent from the following detailed description, the drawings, and the claims.

DETAILED DESCRIPTION OF EXEMPLARY EMBODIMENTS

Figure 1:
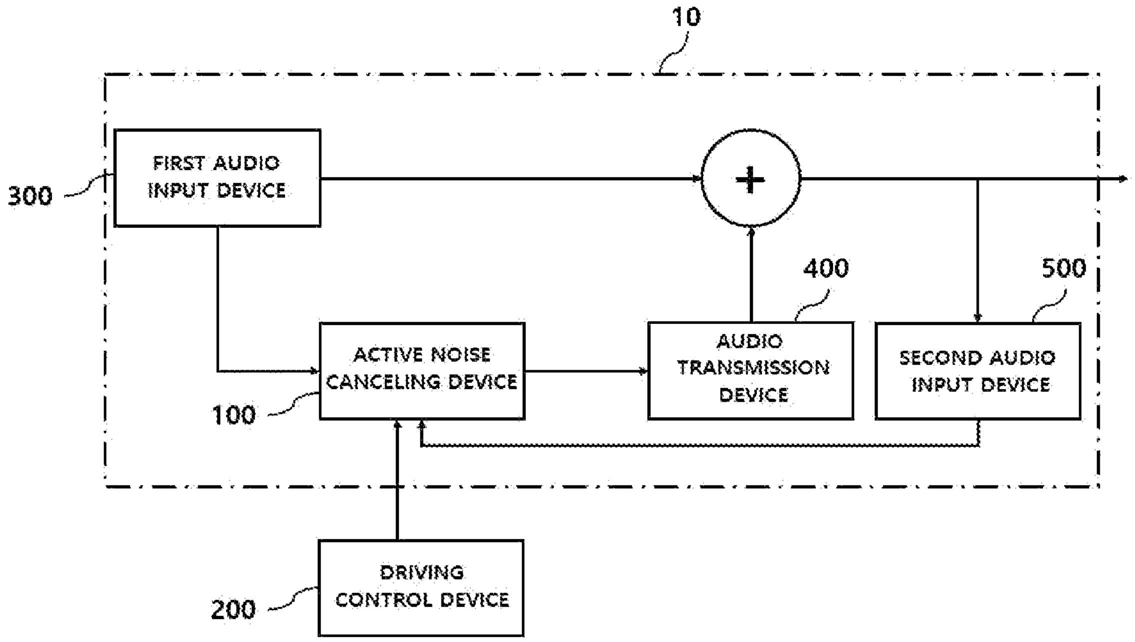
FIG. 1 is a configuration diagram illustrating an active noise cancelling system for a mobile vehicle according to an exemplary embodiment of the present disclosure.

The aspects, features, and advantages of the present disclosure will become apparent from the following description of the exemplary embodiments with reference to the accompanying drawings, which are set forth hereinafter. The specific structures and functional description will be only provided for the purpose of illustration of the exemplary embodiments according to the concept of the disclosure, so that the exemplary embodiments of the disclosure may be embodied in many different forms and should not be construed as being limited to the exemplary embodiments set forth herein. The exemplary embodiments according to the concept of the disclosure may be changed to diverse forms, so that the disclosure will be described and illustrated with reference to specific exemplary embodiments. However, it should be understood that the exemplary embodiments according to the concept of the invention are not intended to limit to the specific exemplary embodiments disclosed, but they include all the modifications, equivalences, and substitutions, which are included in the scope and spirit of the invention. It will be understood that although the terms "first," and/or "second," etc. may be used herein to describe various these elements should not be limited by these terms. These terms are only used to distinguish one element from another element. Thus, a first element discussed below could be termed a second element and vice versa without: departing from the nature of the present disclosure. It will be understood that when an element is referred to as being "connected or coupled" to another element, it may be directly connected or coupled to the other element or intervening elements may be present therebetween. In contrast, when an element is referred to as being "directly connected or coupled" to another element, there are no intervening elements present. Other expressions, such as "between" and "directly between," or "adjacent" or "directly adjacent" should be understood in a similar manner. The terminology used herein is for the purpose of describing particular exemplary embodiments only and is not ins-ended to limit the invention. As used herein, the singular forms "a," "an," and "the" are intended to include the plural forms as well, unless the context clearly indicates otherwise. It will be further under-stood that the terms "comprises" and/or "comprising," or "includes" and/or "including," when used in this specification, specify the presence of stated features, integers step, operations, elements and/or components, but do not preclude the presence or addition of one or wore other features, integers, steps, operations, elements, components and/or groups thereof, unless otherwise defined, the meaning of all terms including technical and scientific terms used herein are the same as those common understood by one of ordinary skill in the art to which the present disclosure pertains. It will be further understood that terms, such as those defined in commonly used dictionaries, should be interpreted as having a meaning which is consistent with their weaning in the context of the relevant art and the present disclosure, and will not be interpreted to an idealized or overly formal sense unless expressly so defined herein, Hereinafter, exemplary embodiments will be described in detail with reference to the accompanying drawings. The same reference numerals indicated in the drawings refer to similar elements throughout.

FIG. 1 is a configuration diagram illustrating an active noise cancelling system tor a mobile vehicle according to an exemplary embodiment of the present disclosure.

Referring to FIG. 1, an active noise cancelling system 10 for a mobile vehicle according to an exemplary embodiment of the present disclosure may include an active noise canceling device 100, a first audio input device 300, an audio transmission device 400, and a second audio input device 500.

The active noise cancelling device 100 may generate cancellation target noise information from a sound signal input to the first audio input device 300 and provide a noise control signal to the audio transmission device 400, The active noise cancelling device 100 may also receive driving information of a mobile vehicle from a driving control device 200 installed in the mobile vehicle. The active noise cancelling device 100 may vary a period for generating a noise control signal according to the driving information of the mobile vehicle. A method by which the active noise cancelling device 100 varies the period for generating a noise control signal according to the driving information of the mobile vehicle will be described below with reference to FIG. 2, In addition, the active noise cancelling device 100 may receive a correction signal input to the second audio input device 500 and provide a noise control signal corresponding to the correction signal to the audio transmission device 40.

The first audio input device 300 may transmit the input sound signal to the active noise cancelling device 100. The first audio input device 300 may be a reference microphone and may measure noise to be con trolled in advance. In addition, the first audio input device 300 may measure noise caused oy vibrations, electrical signals, etc.

The audio transmission device 400 may output she noise control signal transmitted from the active noise cancelling device 100. When the noise control signal is physically output by the audio transmission device 400, the signal corresponding to cancellation target noise in an existing sound signal may be canceled by she noise control signal, thereby cancelling noise.

The second audio input device 500 may be installed at a target point at which noise is to be controlled. That is, the second audio input device 500 may be a microphone that measures noise control results, and a correction signal in which cancellation target noise is canceled may be input. The second audio input device 500 may transmit the input correction signal to the active noise cancelling device 100.

The driving control device 200 may be included in the mobile vehicle on which the active noise cancelling system 10 according to the present disclosure is mounted. The driving control device 200 may control driving of the mobile vehicle and generate driving information of the mobile vehicle. For example, the driving control device 200 may generate acceleration information indicating a level of acceleration or deceleration of a speed of the mobile vehicle, pedal and brake input/output information of the mobile vehicle, torque output information, and revolutions per minute (RPM) information. The driving control device 200 may transmit driving information of the mobile vehicle including at least one of the generated acceleration information, pedal and brake input/output information of the mobile vehicle, torque output information, and RPM information to the active noise cancelling device 100. Here, the active noise cancelling device 100 may determine the level or noise generation based on the driving information of the mobile vehicle and vary a period for generating the noise control signal accordingly.

Figure 2:
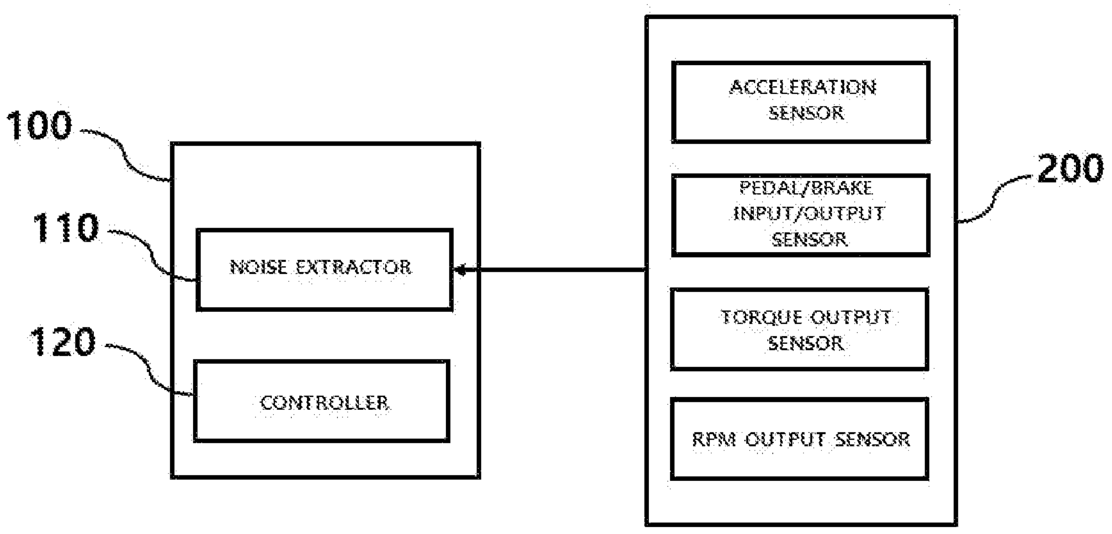
FIG. 2 is a configuration diagram illustrating an active noise cancelling device for a mobile vehicle according to an exemplary embodiment of the present disclosure.

FIG. 2 is a configuration diagram illustrating an active noise cancelling device for a mobile vehicle according to an exemplary embodiment of the present disclosure.

Referring to FIG. 2, the active noise cancelling device 100 for a mobile vehicle according to the present disclosure may include a noise extractor 110 and a controller 120.

According to an exemplary embodiment of the present disclosure, the active noise cancelling device 100 may include a processor (e.g., computer, microprocessor, CPU, ASIC, circuitry, logic circuits, etc.) and an associated non-transitory memory storing software instructions which, when executed by the processor, provides the functionalities of the noise extractor 110 and the controller 120. Herein, the memory and the processor may be implemented as separate semiconductor circuits. Alternatively, the memory and the processor may be implemented as single integrated semi-conductor circuit. The processor may embody one or more processor(s). Here, the controller 110 may process signals transmitted between elements of the active noise cancelling device 100, or: between the active noise cancelling device 100 and the driving control device 100, or between the active noise cancelling device 100 and the audio transmission device 400.

The noise extractor 110 may generate cancelation target noise information from a sound signal input from the first audio input device 300. In addition the noise extractor 110 may vary the period for generating cancellation target noise information based on the driving information of the mobile vehicle received from the driving control device 200. The noise extractor 110 may predict the level of noise generation based on the acceleration information, torque output information, RPM output information, and pedal and brake input/output information included in the driving information or the mobile vehicle. The noise extractor 110 may vary the period for generating the cancellation target noise information based on the predicted level of noise generation. For example, the noise extractor 110 may determine a speed of the mobile vehicle through the driving information received from the driving control device 200 of the mobile vehicle, predict that road surface noise and wind noise increase as the speed of the mobile vehicle increases, and perform a corresponding noise control algorithm. In addition, the noise extractor 110 may determine the level of rotation of the motor (engine) of the mobile vehicle through the driving information received from the driving control device 200 of the mobile vehicle, predict that noise of the motor (engine) increases as the RPM or the motor (engine increases, and perform a corresponding noise control algorithm.

In addition, the noise extractor 110 may generate cancellation target noise information using she filtered-x least mean square (FxLMS) algorithm. A convergence coefficient (μ) value of the FxLMS algorithm used in active noise control may be an optimal value selected in designing and used as a fixed value, but, in the active noise cancelling device 100 according to the present disclosure, the convergence coefficient (μ) value of the FxLMS algorithm may be varied according to the driving information received from the driving control device 200 of the mobile vehicle, and the period for generating cancellation target noise information may be varied by varying the convergence coefficient (μ) value. For example, in stable driving situations, such as constant speed driving, the noise extractor 110 may set the convergence coefficient (μ) to be smaller than a reference value to set the period for generating cancellation target noise information to be faster. In addition, the noise extractor 210 may set the convergence coefficient: (μ) to be greater than the reference value in driving situations in which driving stability is low, such as high-speed driving or uphill, and a lot of noise is expected, to slow down the period for generating the cancellation target noise information to ensure noise control stability.

The controller 120 may receive cancellation target noise information from the noise extractor 110, generate a noise control signal, which is an inverse wavelength signal of the noise signal, so that the cancellation target noise signal included in the input sound signal is canceled, and transmit the generated noise control signal to the audio transmission device 400. The controller 110 may generate the noise control signal through a transfer function S(z) considering a distance between the audio transmission device 400 and the second audio input device 500, the performance of the audio transmission device 400 and equipment, such as a computer, etc.

For example, the noise extractor 110 may receive a sound signal x(n) from the first audio input device 300. The noise extractor 110 may generate cancellation target noise information y(n) from the sound signal x(n) through the FxLMS algorithm, an adaptive filter W(z), etc. At this time, the noise extractor 110 may vary the period for generating the cancellation target noise information y(n) based on a correction signal e(n) input to the second audio input device 500 and the driving information received from the driving control device 200, which may be expressed mathematically by [Equation 1] below.

$$W(n+1)=W(n)-\mu e(n)x'(n) \qquad \text{[Equation 1]}$$

Here, x'(n) may be a convolution product of the input sound signal x(n) and S(z), which is the transfer function of the controller 120. When the controller 120 receives the cancellation target noise information y(n) from the noise extractors 110 the controller 120 may transmit a noise control signal c(n) to the audio transmission device 400 so that the target noise is canceled.

Figure 3:
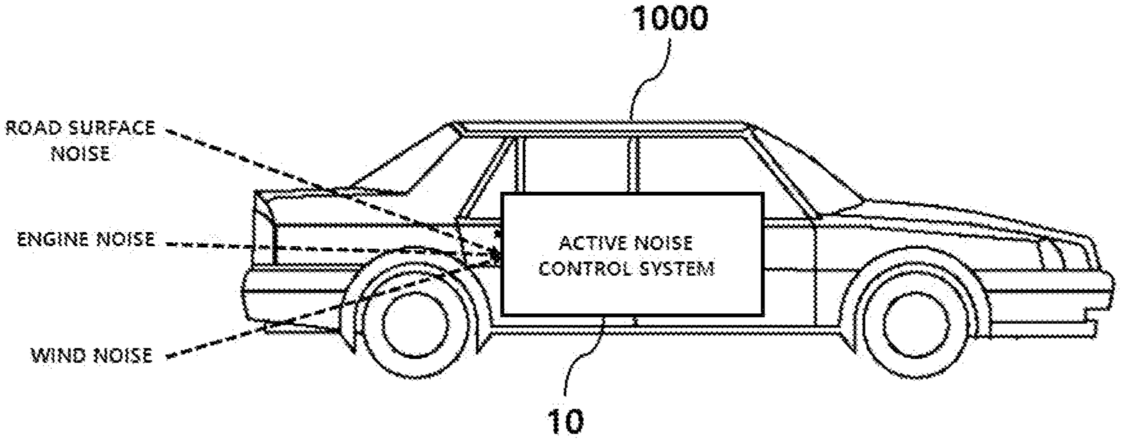
FIG. 3 is an exemplary diagram illustrating a method for cancelling noise in a mobile device equipped with an active noise cancelling system according to an exemplary embodiment of the present disclosure.

FIG. 3 is a diagram illustrating a method for cancelling noise in a mobile vehicle equipped with an active noise cancelling system according to an exemplary embodiment of the present disclosure.

Referring to FIG. 3, the active noise cancelling system 10 or active noise cancelling device 100 according to the present disclosure may be mounted on a mobile vehicle 1000. Hereinafter, for convenience of description, the description will be given based on the active noise cancelling system 10, which includes all of the active noise cancelling device 100, the audio input devices 300 and 500, and the audio transmission device 400.

The active noise cancelling system 10 may control various noises generated while the mobile vehicle 1000 is driving. The active noise cancelling system 10 may control road surface noise, engine (motor) noise, wind noise, etc. generated while the mobile vehicle 1000 is driving. The active noise cancelling system 10 may receive driving information of the mobile vehicle 1000, predict the level of noise generation according to a driving situation of the mobile vehicle 1000, and vary the period for generating a noise control signal. The active noise cancelling system 10 may set the level of noise generation according to speed, the level of noise generation according to the RPM of the motor or engine, and the level of noise generation according to the size of pedal and brake input output in advance. The active noise cancelling system 10 may predict the level of noise generation according to the driving information by comparing she preset level value of noise generation with the driving information received from the mobile vehicle 1000 and vary the period for generating the noise control signal accordingly.

For example, as the size of pedal and brake input of the mobile vehicle 1000 increases, noise generated by friction with the road surface may increase, and the active noise cancelling system 10 may divide noise levels according to input sizes and store the same by stages. In addition, as the torque and RPM output of the mobile vehicle 1000 increases, noise due to rotation of the motor (engine) may increase, and the active noise cancelling system 10 may divide noise levels according to output sizes and store the same by stages. In addition, as the speed of she mobile vehicle 1000 is faster, noise generated by wind noise may increase, and the active noise cancelling system 10 may divide noise levels according to speeds and store the same by stages.

In general, since the level of noise is small in stable driving situations (e.g., driving on paved roads, constant speed driving, etc.), the active noise cancelling system 10 may shorten the period for generating the noise control signal, thereby maximizing the active noise control effect. Conversely, since the level of noise is large in driving situations with low stability (e.g., high-speed driving, sudden acceleration, sudden starting, driving on unpaved roads, uphill roads, etc.), the active noise cancelling system 10 may lengthen the period for generating the noise control signal to respond to a relatively large noise signal, thereby maximizing the stability of noise control.

According to the present disclosure, noise may be controlled depending an the driving situation of a mobile vehicle.

In addition, according to the present disclosure, noise may be controlled according to acceleration information of a mobile vehicle.

In addition, according to the pre sent: disclosure, noise may be controlled according to torque output information of a mobile vehicle.

In addition, according to the present disclosure, noise may be controlled according to RPM output information of a mobile vehicle.

In addition, according to the present disclosure, noise may be controlled according to pedal and brake input/output information of a mobile vehicle.

Although the preferred exemplary embodiments of the present disclosure have been described above, the exemplary embodiments disclosed in the present disclosure are not intended to limit the technical spirit of the present disclosure, but are only for explanation. Therefore, the technical spirit of the present disclosure includes not only each disclosed exemplary embodiment, but also a combination of the disclosed exemplary embodiments, and furthermore, the scope of the technical spirit of the present disclosure is not limited by these exemplary embodiments. In addition, those skilled in the art to which the present disclosure pertains may make many changes and modifications to the present disclosure without departing from the spirit and scope of the appended claims, and all such appropriate changes and modifications, as equivalents, are to be regarded as falling within the scope of the present disclosure.

DETAILED DESCRIPTION OF MAIN ELEMENTS

10: active noise cancelling system
100: active noise cancelling device
110: noise extractor
120: controller
200: driving control device
300: first audio input device
400: audio transmission device
500: second audio input device
1000: mobile vehicle

What is claimed is:

1. An active noise cancelling device for a mobile vehicle, comprising:

a noise extractor configured to generate cancellation target noise information from an input sound signal; and a controller configured to provide a noise control signal to an audio transmission device based on the cancellation target noise information, wherein the noise extractor is further configured to vary a period for generating the cancellation target noise information based on driving information of the mobile vehicle, wherein the driving information of the mobile vehicle includes at least one of acceleration information, torque output information, revolutions per minute (RPM) output information, or pedal and brake input/output information of the mobile vehicle, and wherein, when the driving information of the mobile vehicle is received, the noise extractor predicts a level of noise generation according to a driving situation by comparing the received driving information with prestored data, and varies the period for generating the cancellation target noise information according to the predicted level of noise generation.

2. The active noise cancelling device of claim 1, wherein the noise extractor generates the cancellation target noise information using a filtered-x least mean square (FxLMS) algorithm and varies the period for generating the cancellation target noise information by varying a convergence coefficient of the FxLMS algorithm according to the driving information of the mobile vehicle.

3. The active noise cancelling device of claim 1, wherein the noise extractor varies the period for generating the cancellation target noise information according to a level of acceleration of the mobile vehicle based on the acceleration information.

4. The active noise cancelling device of claim 1, wherein the noise extractor varies the period for generating the cancellation target noise information according to a level of torque output of the mobile vehicle based on the torque output information.

5. The active noise cancelling device of claim 1, wherein the noise extractor varies the period for generating the cancellation target noise information according to a level of RPM output of the mobile vehicle based on the RPM output information.

6. The active noise cancelling device of claim 1, wherein the noise extractor varies the period for generating the cancellation target noise information based on the pedal and brake input/output information.

7. An active noise cancelling system for a mobile vehicle, comprising:

the active noise cancelling device of claim 1;

a first audio input device through which the input sound signal is input;

the audio transmission device outputting the noise control signal; and a second audio input device to which a correction signal obtained by combining the input sound signal and the noise control signal is input, wherein the active noise cancelling device varies at least one characteristic of a convergence speed or stability of a noise estimation function based on the driving information of the mobile vehicle, receives the correction signal, and generates the noise control signal based on the correction signal.

8. The active noise cancelling system of claim 7, wherein the active noise cancelling device generates the noise control signal using a filtered-x least mean square (FxLMS) algorithm and varies at least one characteristic of the convergence speed or the stability of the noise estimation function by varying a convergence coefficient of the FxLMS algorithm according to the driving information of the mobile vehicle.

* * * * *